US012456844B2

(12) United States Patent
Huang et al.

(10) Patent No.: US 12,456,844 B2
(45) Date of Patent: Oct. 28, 2025

(54) RECEPTACLE CONNECTOR, PLUG CONNECTOR, AND CONNECTOR ASSEMBLY WITH EASY INSTALLATION FEATURES

(71) Applicant: DONGGUAN LUXSHARE TECHNOLOGIES CO., LTD, Dongguan (CN)

(72) Inventors: Bin Huang, Dongguan (CN); Rongzhe Guo, Dongguan (CN); Baiyu Duan, Dongguan (CN); Chenhui Zeng, Dongguan (CN); Hongji Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 454 days.

(21) Appl. No.: 18/094,630

(22) Filed: Jan. 9, 2023

(65) Prior Publication Data

US 2023/0275374 A1 Aug. 31, 2023

(30) Foreign Application Priority Data

Feb. 25, 2022 (CN) ......................... 202210179804.7

(51) Int. Cl.
*H01R 13/6582* (2011.01)
*H01R 12/72* (2011.01)
(Continued)

(52) U.S. Cl.
CPC ....... *H01R 13/6582* (2013.01); *H01R 12/721* (2013.01); *H01R 12/722* (2013.01);
(Continued)

(58) Field of Classification Search
CPC .......................... H01R 13/6582; H01R 12/721; H01R 12/722; H01R 13/187; H01R 13/428;
(Continued)

(56) References Cited

U.S. PATENT DOCUMENTS 7,357,673 B2 * 4/2008 Long .................... H05K 9/0058 439/607.05
2011/0279984 A1 * 11/2011 Su ...................... H01R 13/6582 361/728

(Continued)

FOREIGN PATENT DOCUMENTS

CN 104022398 A 9/2014
CN 113437556 A 9/2021
CN 114024160 A 2/2022

*Primary Examiner* — Justin M Kratt
(74) *Attorney, Agent, or Firm* — Birch, Stewart, Kolasch & Birch, LLP

(57) ABSTRACT

A receptacle connector includes a receptacle insulating body, a number of conductive terminals and a metal outer cage. The metal outer cage includes a receiving space for receiving a plug connector. The receptacle insulating body includes a first receptacle portion and a second receptacle portion integrally formed. A plug connector includes a metal plug housing and a built-in circuit board. The metal plug housing includes a first plug portion and a second plug portion integrally formed. The present disclosure also discloses a connector assembly having the receptacle connector and the plug connector.

20 Claims, 24 Drawing Sheets

(51) Int. Cl.

| | |
|---|---|
| ***H01R 13/187*** | (2006.01) |
| ***H01R 13/428*** | (2006.01) |
| ***H01R 13/6587*** | (2011.01) |
| ***H01R 24/20*** | (2011.01) |
| ***H01R 25/00*** | (2006.01) |
| *H01R 12/71* | (2011.01) |
| *H01R 13/50* | (2006.01) |
| *H01R 13/648* | (2006.01) |
| *H01R 13/658* | (2011.01) |
| *H01R 13/6581* | (2011.01) |
| *H01R 13/6583* | (2011.01) |
| *H01R 13/6586* | (2011.01) |
| *H01R 13/6594* | (2011.01) |

(52) U.S. Cl.

CPC ......... *H01R 13/187* (2013.01); *H01R 13/428* (2013.01); *H01R 13/6587* (2013.01); *H01R 24/20* (2013.01); *H01R 25/00* (2013.01); *H01R 12/712* (2013.01); *H01R 12/714* (2013.01); *H01R 12/716* (2013.01); *H01R 12/72* (2013.01); *H01R 12/724* (2013.01); *H01R 12/725* (2013.01); *H01R 12/727* (2013.01); *H01R 13/50* (2013.01); *H01R 13/648* (2013.01); *H01R 13/658* (2013.01); *H01R 13/6581* (2013.01); *H01R 13/6583* (2013.01); *H01R 13/6586* (2013.01); *H01R 13/6594* (2013.01)

(58) Field of Classification Search

CPC .... H01R 13/6587; H01R 24/20; H01R 25/00; H01R 12/712; H01R 12/714; H01R 12/716; H01R 12/72; H01R 12/724; H01R 12/725; H01R 12/727; H01R 13/50; H01R 13/648; H01R 13/658; H01R 13/6581; H01R 13/6583; H01R 13/6586; H01R 13/6594

See application file for complete search history.

(56) References Cited

U.S. PATENT DOCUMENTS

| | | | | |
|---|---|---|---|---|
| 2013/0059479 A1* | 3/2013 | Ho | ........................ | H01R 27/02<br>439/639 |
| 2017/0352990 A1 | 12/2017 | Zhao | | |

* cited by examiner

RECEPTACLE CONNECTOR, PLUG CONNECTOR, AND CONNECTOR ASSEMBLY WITH EASY INSTALLATION FEATURES

CROSS-REFERENCE TO RELATED APPLICATION

This patent application claims priority of a Chinese Patent Application No. 202210179804.7, filed on Feb. 25, 2022 and titled "RECEPTACLE CONNECTOR, PLUG CONNECTOR, AND CONNECTOR ASSEMBLY", the entire content of which is incorporated herein by reference.

TECHNICAL FIELD

The present disclosure relates to a receptacle connector, a plug connector and a connector assembly, which belongs to a technical field of connectors.

BACKGROUND

With the continuous improvement of the communication port requirements of electronic equipment, the number of communication ports is gradually increasing. In general, one communication port corresponds to one connector. At this time, when the number of communication ports is multiple, it is generally adopted in the related art to install a plurality of single connectors on a circuit board in a side-by-side manner. However, this installation is relatively complicated, and how to avoid interference between the connectors during installation is also a technical problem to be solved by those skilled in the art.

SUMMARY

An object of the present disclosure is to provide a receptacle connector, a plug connector and a connector assembly which are easy to install.

In order to achieve the above object, the present disclosure adopts the following technical solution: a receptacle connector, including: a receptacle insulating body; a plurality of conductive terminals disposed on the receptacle insulating body; and a metal outer cage, the metal outer cage shielding the receptacle insulating body, the metal outer cage including a receiving space located at a front end of the receptacle insulating body, the receiving space is configured to receive a plug connector along a first direction; wherein the receptacle insulating body includes a first receptacle portion and a second receptacle portion; the first receptacle portion and the second receptacle portion are arranged side by side along a second direction perpendicular to the first direction; the first receptacle portion and the second receptacle portion are integrally formed; the first receptacle portion includes a first insertion slot; the second receptacle portion includes a second insertion slot; the first insertion slot and the second insertion slot communicate with the receiving space; and wherein the plurality of conductive terminals include a plurality of first conductive terminals and a plurality of second conductive terminals, each first conductive terminal includes a first elastic mating portion protruding into the first insertion slot, and each second conductive terminal includes a second elastic mating portion protruding into the second insertion slot.

In order to achieve the above object, the present disclosure adopts the following technical solution: a plug connector configured to be inserted into a receptacle connector along a first direction, the plug connector including: a metal plug housing; and a built-in circuit board; wherein the metal plug housing includes a first plug portion and a second plug portion; the first plug portion and the second plug portion are arranged side by side along a second direction perpendicular to the first direction; the first plug portion and the second plug portion are integrally formed; the first plug portion includes a first accommodating space, the second plug portion includes a second accommodating space; and wherein the built-in circuit board includes a first tongue plate suspended in the first accommodating space and a second tongue plate suspended in the second accommodating space, at least one surface of the first tongue plate is provided with a plurality of first conductive pads, and at least one surface of the second tongue plate is provided with a plurality of second conductive pads.

In order to achieve the above object, the present disclosure adopts the following technical solution: a connector assembly, including: the above receptacle connector; and the above plug connector; wherein the first plug portion and the second plug portion of the plug connector are inserted into the receiving space of the receptacle connector; the first tongue plate is inserted into the first insertion slot, so that the first elastic mating portions of the first conductive terminals contact the first conductive pads of the first tongue plate; and the second tongue plate is inserted into the second insertion slot, so that the second elastic mating portions of the second conductive terminals contact the second conductive pads of the second tongue plate.

In order to achieve the above object, the present disclosure adopts the following technical solution: a connector assembly, including: a receptacle connector, including: a receptacle insulating body; a plurality of conductive terminals arranged on the receptacle insulating body; and a metal outer cage shielding the receptacle insulating body, the metal outer cage including a receiving space located at a front end of the receptacle insulating body, the receiving space being configured to receive a plug connector along a first direction; wherein the receptacle insulating body includes a first receptacle portion and a second receptacle portion; the first receptacle portion and the second receptacle portion are arranged side by side along a second direction perpendicular to the first direction; the first receptacle portion and the second receptacle portion are integrally formed; the first receptacle portion includes a first insertion slot; the second receptacle portion includes a second insertion slot; the receiving space includes a first receiving space and a second receiving space; the first receiving space communicates with the first insertion slot; and the second receiving space communicates with the second insertion slot; wherein the plurality of conductive terminals include a plurality of first conductive terminals and a plurality of second conductive terminals; each first conductive terminal includes a first elastic mating portion protruding into the first insertion slot; each second conductive terminal includes a second elastic mating portion protruding into the second insertion slot; and a plug connector, including: a metal plug housing; and a built-in circuit board; wherein the metal plug housing includes a first plug portion, and the first plug portion includes a first accommodating space; and wherein the built-in circuit board includes a first tongue plate suspended in the first accommodating space, and at least one surface of the first tongue plate is provided with a plurality of first conductive pads; wherein the plug connector is configured to be inserted into the first receiving space or the second receiving space of the receptacle connector along the first direction; the first tongue plate is inserted into the first insertion slot or the second insertion slot, so that the first conductive pads of the first tongue plate contact the first elastic mating portions of the first conductive terminals or the second elastic mating portions of the second conductive terminals.

Compared with the prior art, in the present disclosure, a single receptacle connector is provided with at least two ports by integrally molding the first receptacle portion and the second receptacle portion. When the receptacle connector is mounted to a circuit board, it is equivalent to connecting at least two ports to the circuit board at the same time.

In addition, a single plug connector is provided with at least two plug ports by integrally molding the first plug portion and the second plug portion. When the plug connector is inserted into the receptacle connector, it is equivalent to connecting at least two plug ports with the receptacle connector at the same time.

The connector assembly of the present disclosure includes the receptacle connector and the plug connector, and has the beneficial effects of the receptacle connector and/or the plug connector.

DETAILED DESCRIPTION

Figure 1:
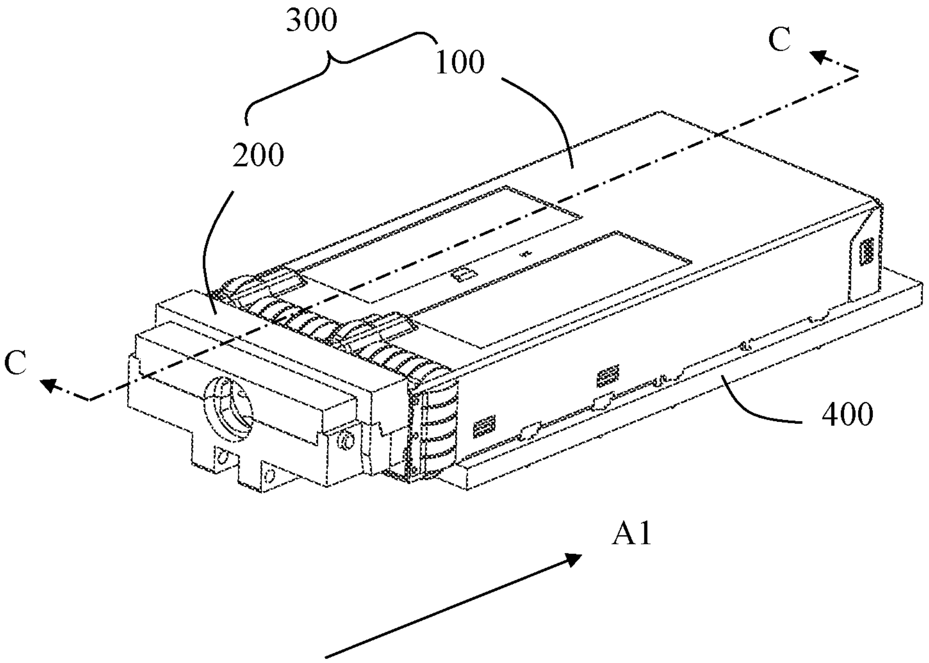
FIG. 1 is a perspective schematic view of a receptacle connector mounted on a circuit board and mated with a plug connector, in accordance with an embodiment of the present disclosure.
Figure 2:
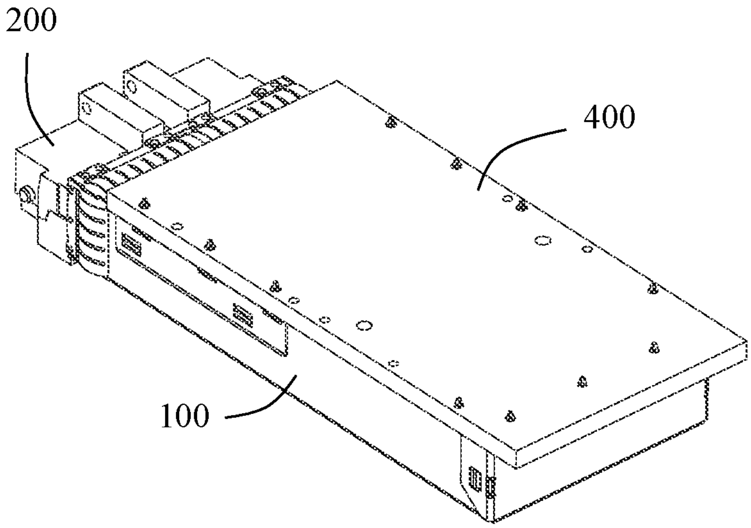
FIG. 2 is a perspective schematic view of FIG. 1 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 4, the present disclosure discloses a connector assembly 300 including a receptacle connector 100 and a plug connector 200 for mating with the receptacle connector 100. In the illustrated embodiment of the present disclosure, the receptacle connector 100 has two SFP (Small Form-factor Pluggable) receptacle ports arranged side by side. The plug connector 200 has two SFP plug ports arranged side by side. The plug connector 200 is adapted to be inserted into the receptacle connector 100 along a first direction A1. In other words, the receptacle connector 100 is adapted to receive the plug connector 200 along the first direction A1. In the illustrated embodiment of the present disclosure, the receptacle connector 100 is a board-end connector for being mounted to a circuit board 400. Of course, in other embodiments, the receptacle connector 100 may also be a cable connector which is not mounted to a circuit board. Alternatively, the receptacle connector 100 is a hybrid connector, that is, a part of the conductive terminals of the receptacle connector 100 are connected to cables, and the other part of the conductive terminals are mounted to a circuit board.

Figure 3:
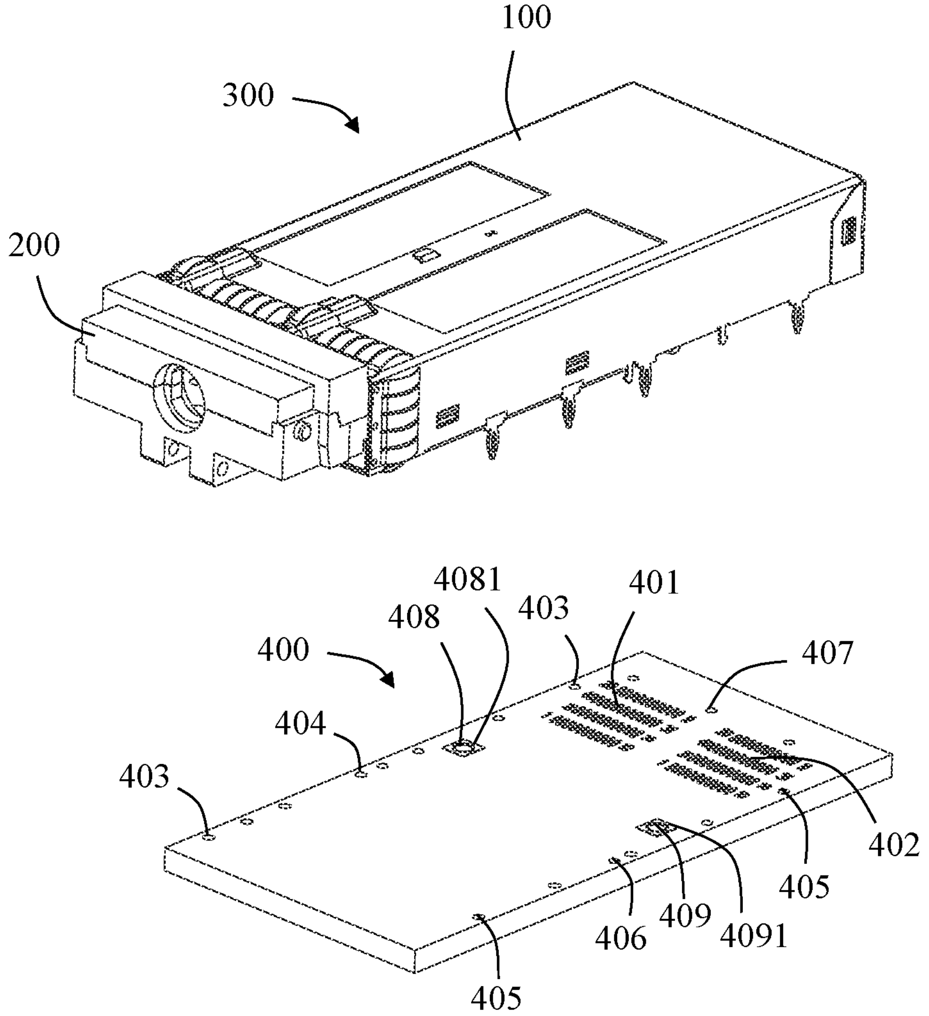
FIG. 3 is a partial perspective exploded view of FIG. 1.
Figure 4:
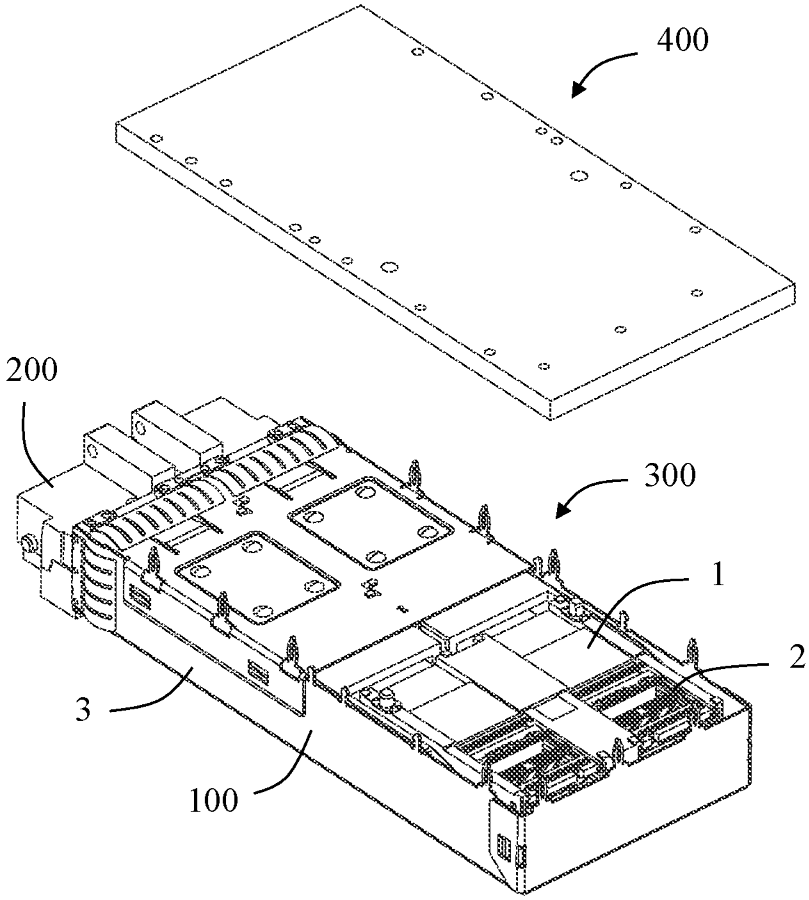
FIG. 4 is another partial perspective exploded view of FIG. 3 from another angle.

Referring to FIG. 3, the circuit board 400 includes a plurality of first soldering pads 401 and a plurality of second soldering pads 402. The plurality of first soldering pads 401 are arranged in four rows parallel to each other. The plurality of second soldering pads 402 are also arranged in four rows parallel to each other.

The circuit board 400 further includes a plurality of first mounting holes 403, a plurality of first locking holes 404, a plurality of second mounting holes 405, a plurality of second locking holes 406, and a plurality of third mounting holes 407. In the embodiment shown in the present disclosure, the plurality of first mounting holes 403 and the plurality of first locking holes 404 are aligned with each other, and are located on a first side of the circuit board 400. The plurality of second mounting holes 405 and the plurality of second locking holes 406 are aligned with each other, and are located on a second side of the circuit board 400. The plurality of third mounting holes 407 are located at a rear end of the plurality of first soldering pads 401 and the plurality of second soldering pads 402. In addition, the circuit board 400 further includes a first positioning hole 408 located on the first side, a first soldering piece 4081 surrounding the first positioning hole 408, a second positioning hole 409 on the second side, and a second soldering piece 4091 surrounding the second positioning hole 409. In the embodiment shown in the present disclosure, the first positioning hole 408 is not aligned with the first mounting holes 403 and the first locking holes 404. The second positioning hole 409 is not aligned with the second mounting holes 405 and the second locking holes 406.

Referring to FIGS. 5 to 17, in the illustrated embodiment of the present disclosure, the receptacle connector 100 includes a receptacle insulating body 1, a plurality of conductive terminals 2, and a metal outer cage 3 shielding the receptacle insulating body 1.

Figure 12:
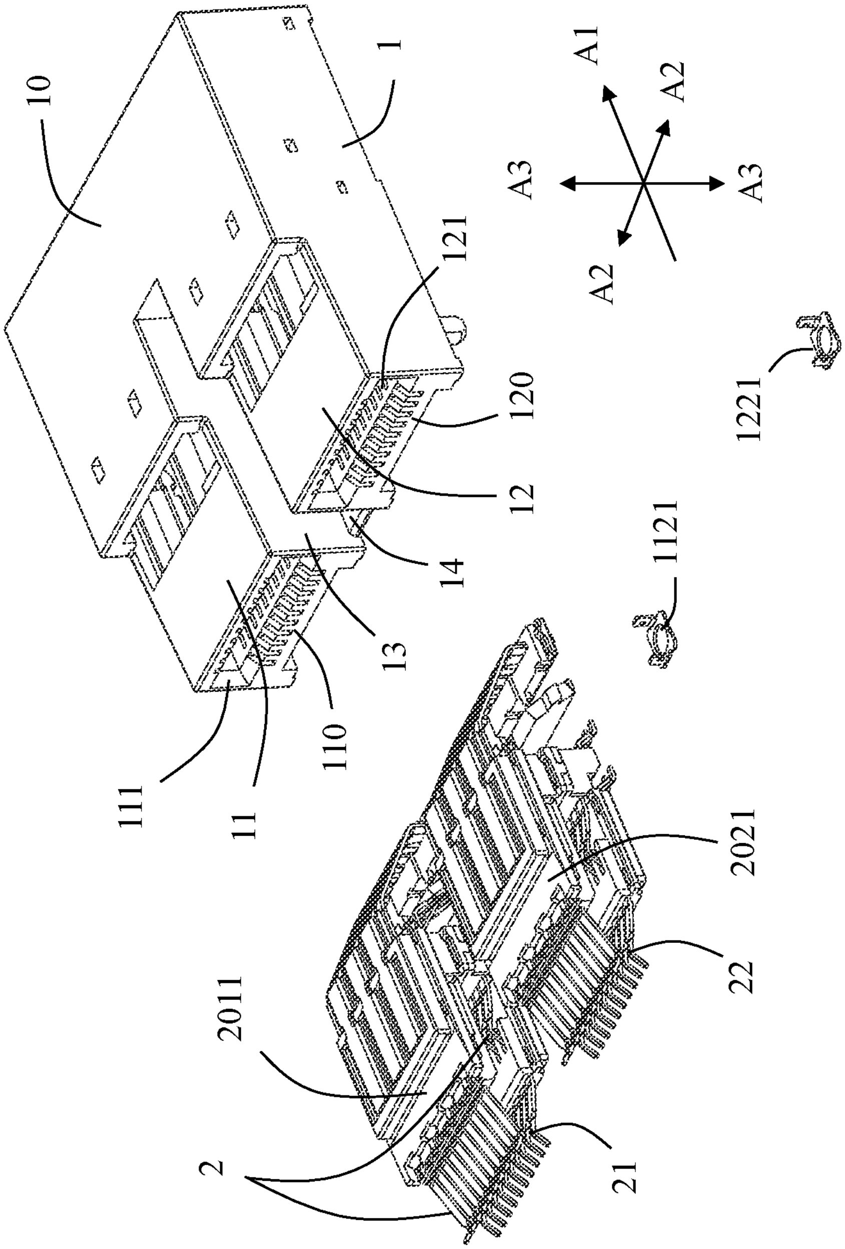
FIG. 12 is a partial perspective exploded view after removing a metal outer cage in FIG. 7.
Figure 13:
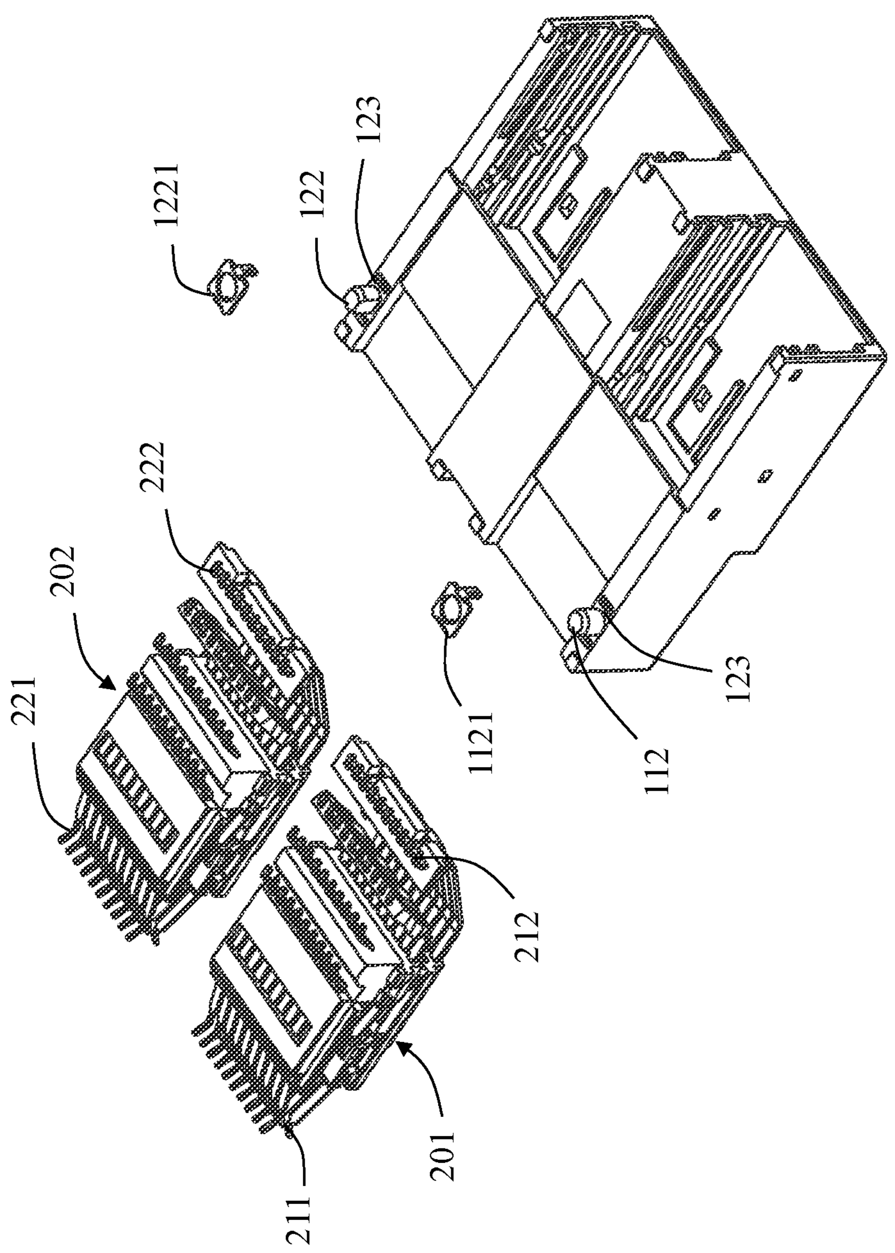
FIG. 13 is a partially exploded perspective view of FIG. 12 from another angle.
Figure 14:
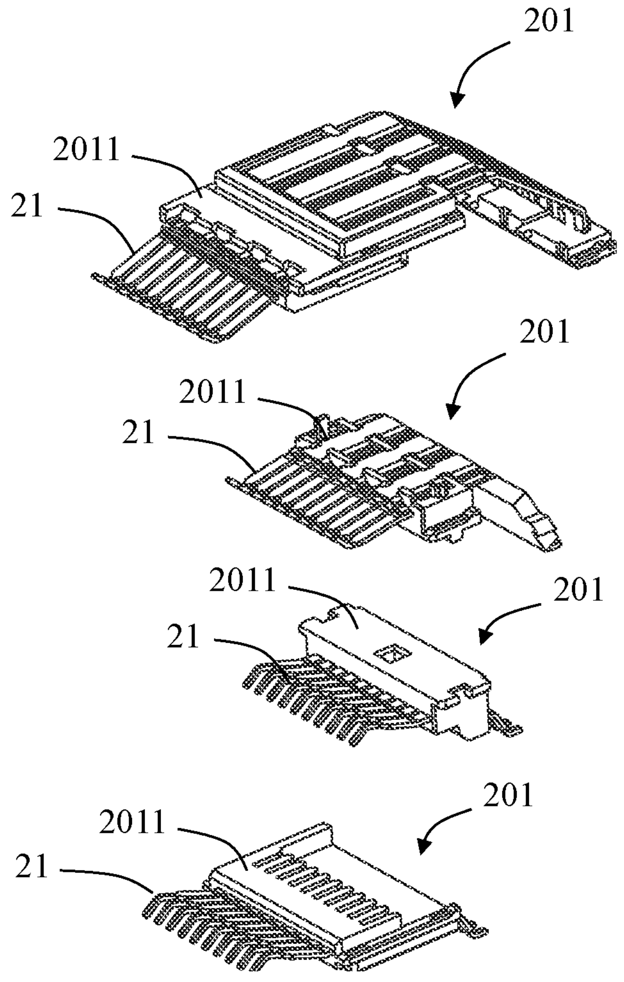
FIG. 14 is a partial perspective exploded view of terminal modules in FIG. 12.
Figure 15:
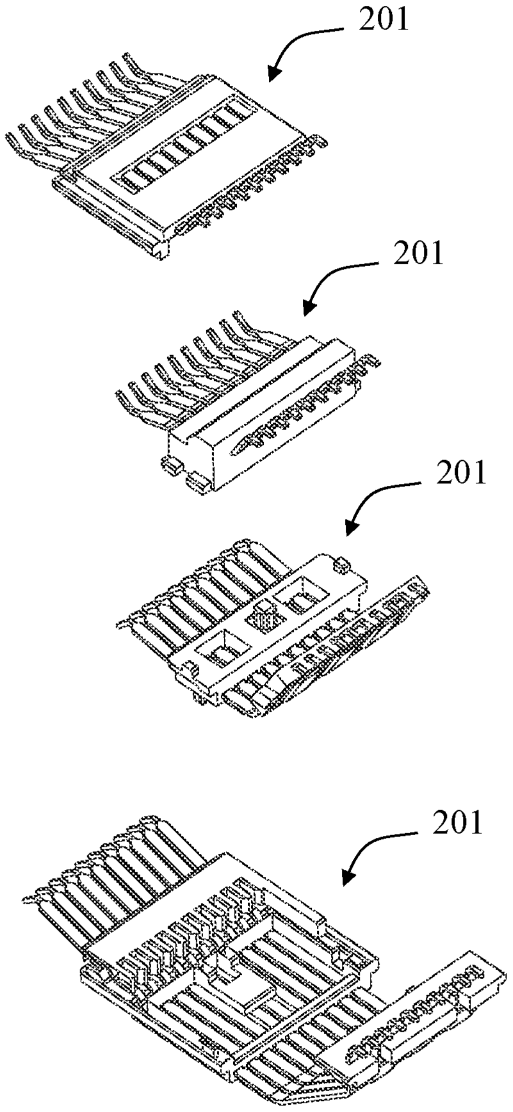
FIG. 15 is a partially exploded perspective view of FIG. 14 from another angle.

Referring to FIG. 12, the receptacle insulating body 1 includes a base 10, a first receptacle portion 11 protruding from one side (e.g., a left side) of the base 10 in a direction opposite to the first direction A1 and protruding beyond the base 10, and a second receptacle portion 12 protruding from the other side (e.g., a right side) of the base 10 in the direction opposite to the first direction A1 and protruding beyond the base 10. The first receptacle portion 11 and the second receptacle portion 12 are arranged side by side along a second direction A2-A2 perpendicular to the first direction A1. The first receptacle portion 11 and the second receptacle portion 12 are integrally formed. The first receptacle portion 11 includes a first insertion surface 110 and a first insertion slot 111 extending through the first insertion surface 110. The second receptacle portion 12 includes a second insertion surface 120 and a second insertion slot 121 extending through the second insertion surface 120.

In the illustrated embodiment of the present disclosure, the first receptacle portion 11 and the second receptacle portion 12 are integrally formed by extending from the base 10. The receptacle insulating body 1 further includes a spacing slot 13 located between the first receptacle portion 11 and the second receptacle portion 12 along the second direction A2-A2. The spacing slot 13 is adapted to partially receive the plug connector 200. The first receptacle portion 11 and the second receptacle portion 12 are symmetrically arranged along the spacing slot 13. The receptacle insulating body 1 further includes a connection wall 14 which connects the first receptacle portion 11 and the second receptacle portion 12. The connection wall 14 is located at a bottom of the spacing slot 13. The structural strength of the first receptacle portion 11 and the second receptacle portion 12 can be increased by providing the connection wall 14. The first receptacle portion 11 is further provided with a first positioning post 112 for being inserted into the first positioning hole 408 and a first mounting piece 1121 is sleeved on the first positioning post 112. The second receptacle portion 12 is further provided with a second positioning post 122 for being inserted into the second positioning hole 409 and a second mounting piece 1221 sleeved on the second positioning post 122. In the illustrated embodiment of the present disclosure, the first mounting piece 1121 and the second mounting piece 1221 are both U-shaped, and are inserted and fixed into the corresponding mounting slits 123 of the second receptacle portion 12. The first mounting piece 1121 and the second mounting piece 1221 are respectively adapted for soldering and fixing with the first soldering piece 4081 and the second soldering piece 4091. On one hand, this design increases the stability of the receptacle connector 100 mounted on the circuit board 400; on the other hand, it is also beneficial to improve the grounding effect.

Referring to FIGS. 12 to 15, the plurality of conductive terminals 2 are directly or indirectly disposed on the receptacle insulating body 1. The plurality of conductive terminals 2 include a plurality of first conductive terminals 21 and a plurality of second conductive terminals 22. Each first conductive terminal 21 includes a first elastic mating portion 211 protruding into the first insertion slot 111 and a first mounting portion 212 extending beyond the receptacle insulating body 1. Each second conductive terminal 22 includes a second elastic mating portion 221 protruding into the second insertion slot 121 and a second mounting portion 222 extending beyond the receptacle insulating body 1. The first elastic mating portions 211 are disposed in at least two rows, and are respectively located on opposite sides of the first insertion slot 111 along a third direction A3-A3. The second elastic mating portions 221 are disposed in at least two rows, and are respectively located on opposite sides of the second insertion slot 121 along the third direction A3-A3. The third direction A3-A3 is perpendicular to the first direction A1 and the second direction A2-A2. The first mounting portions 212 are arranged in four rows to be soldered and fixed with the first soldering pads 401. The second mounting portions 222 are arranged in four rows to be soldered and fixed with the second soldering pads 402.

In the embodiment shown in the present disclosure, the receptacle connector 100 includes a plurality of first terminal modules 201 and a plurality of second terminal modules 202. Each of the first terminal modules 201 includes a first insulating block 2011 and a plurality of first conductive terminals 21 fixed to the first insulating block 2011. In the embodiment shown in the present disclosure, the number of the first terminal modules 201 is four. Correspondingly, the number of the first insulating blocks 2011 is four, and the first conductive terminals 21 are divided into four groups. Each group of the first conductive terminals 21 are insert-molded with a corresponding first insulating block 2011.

Similarly, each second terminal module 202 includes a second insulating block 2021 and a plurality of second conductive terminals 22 fixed to the second insulating block 2021. In the embodiment shown in the present disclosure, the number of the second terminal modules 202 is four. Correspondingly, the number of the second insulating blocks 2021 is four, and the second conductive terminals 22 are divided into four groups. Each group of the second conductive terminals 22 are insert-molded with a corresponding second insulating block 2021.

Figure 5:
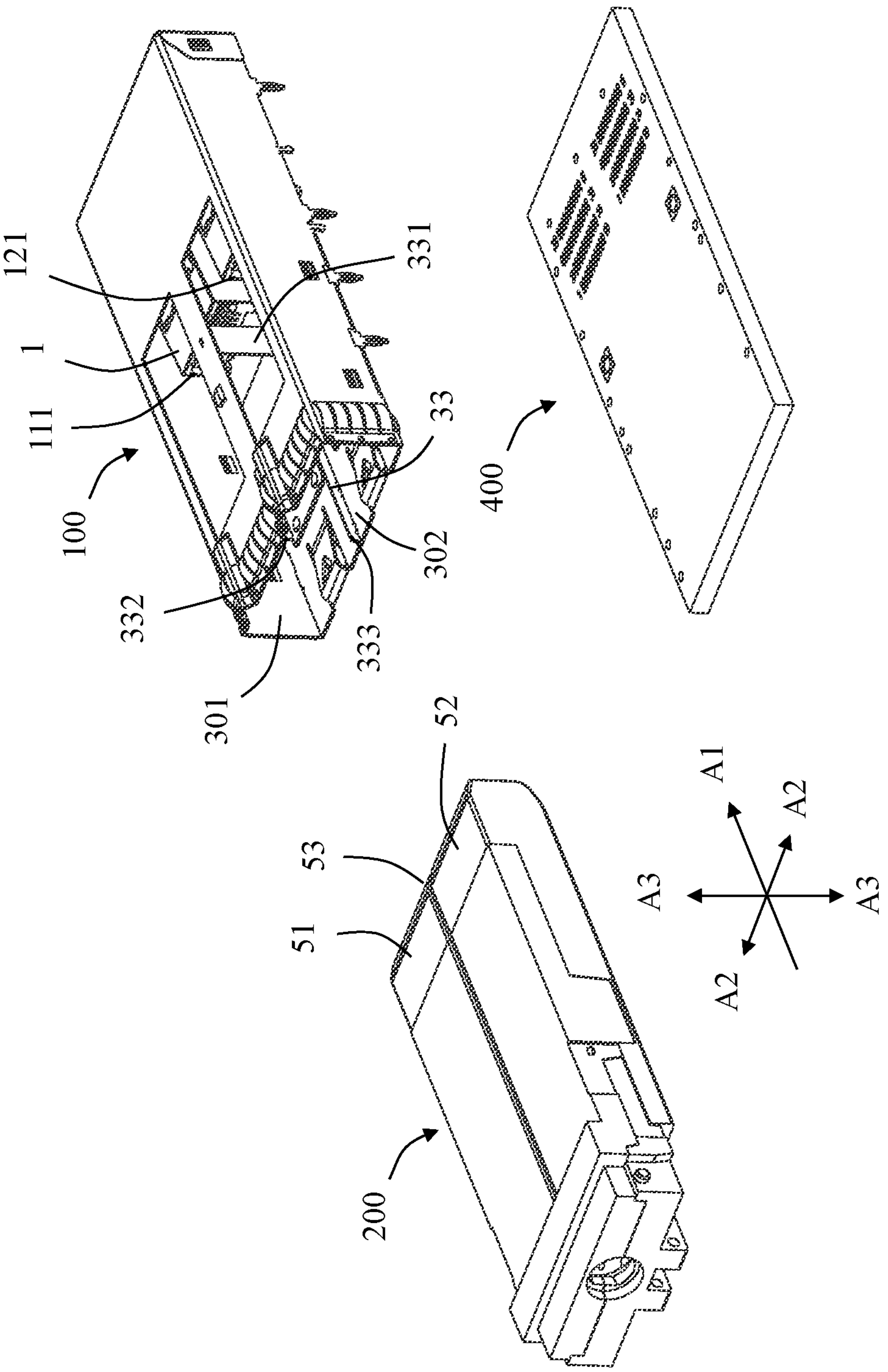
FIG. 5 is a further partial perspective exploded view of FIG. 3.
Figure 6:
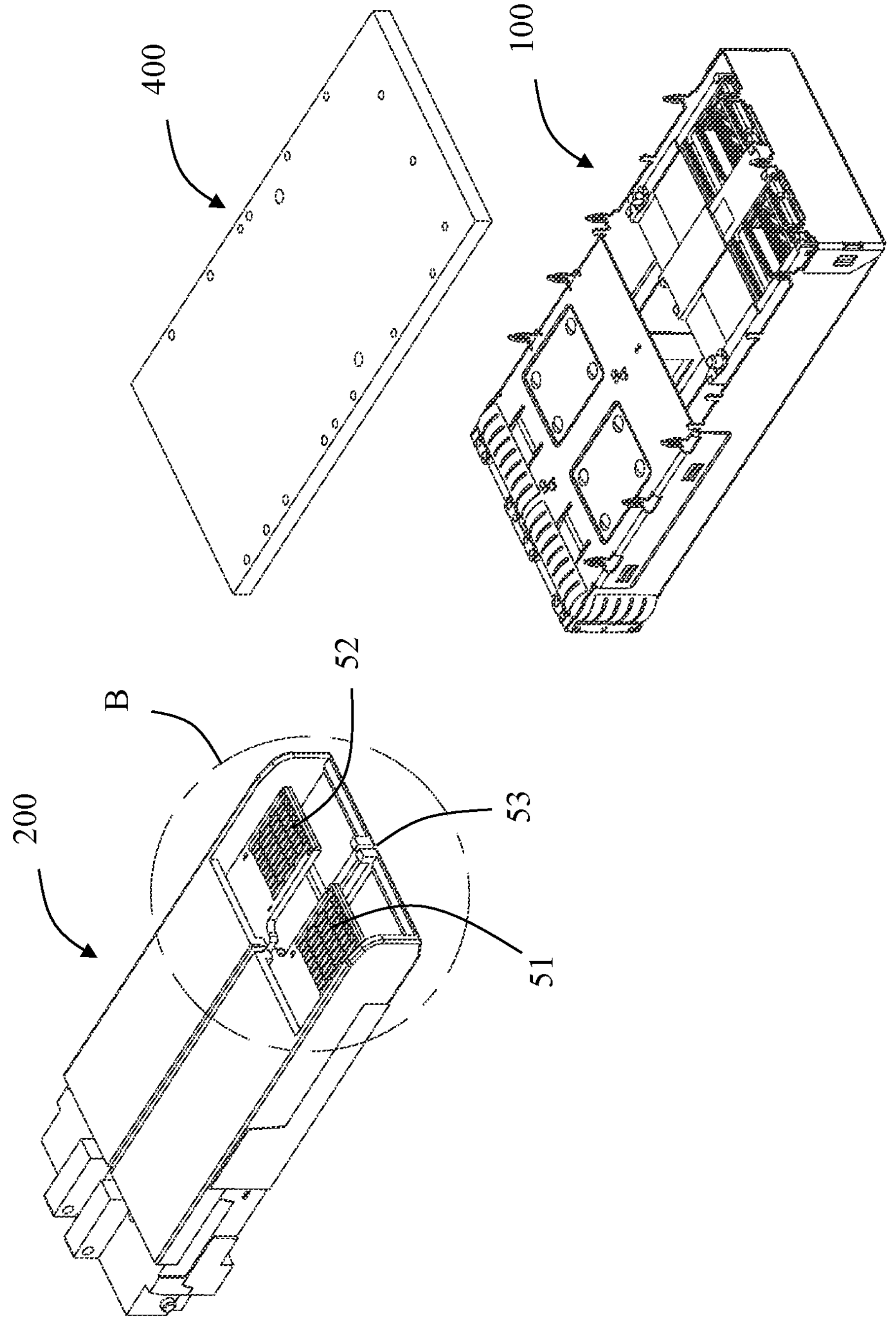
FIG. 6 is another partial perspective exploded view of FIG. 5 from another angle.
Figure 7:
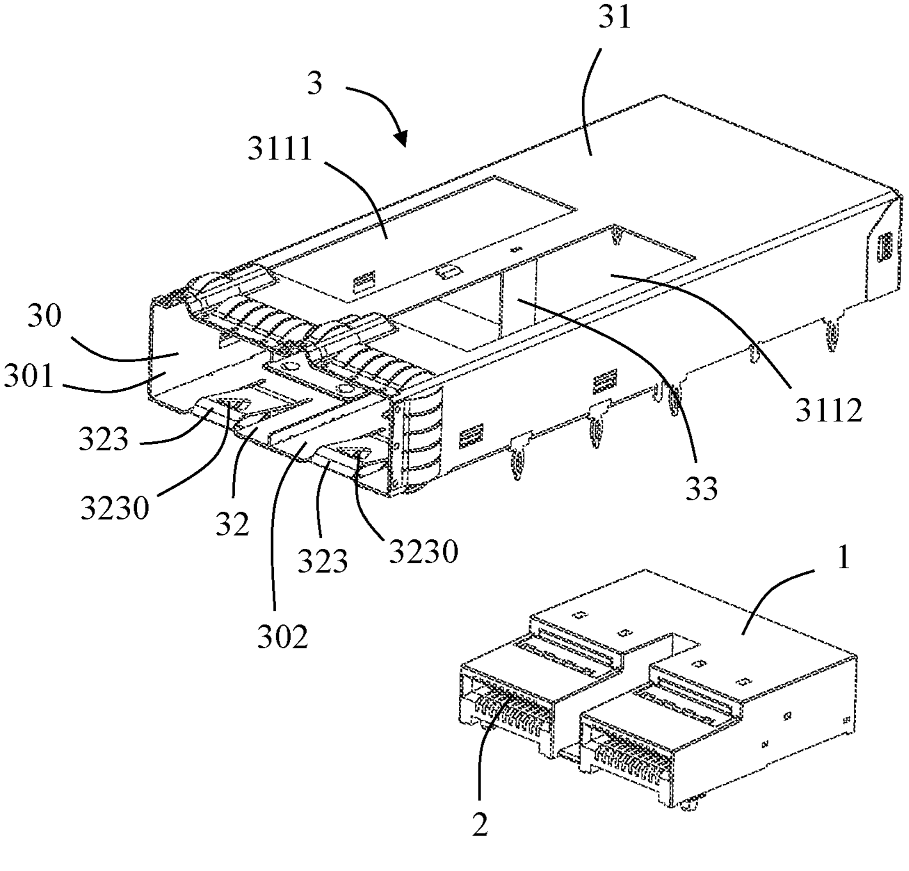
FIG. 7 is a partial perspective exploded view of the receptacle connector.
Figure 8:
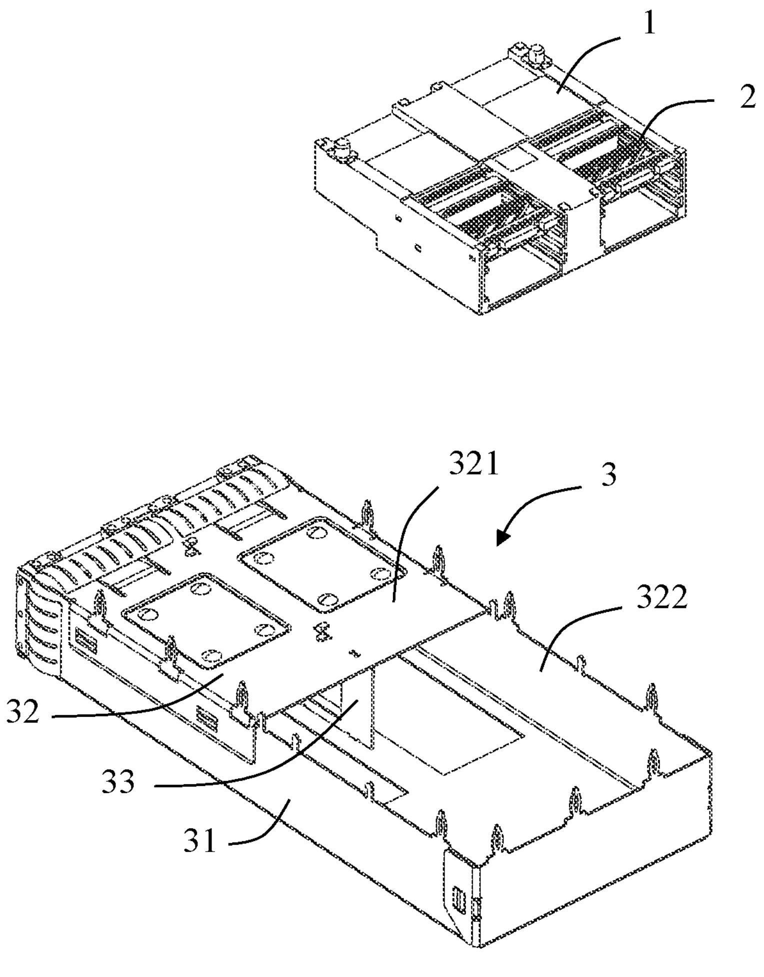
FIG. 8 is a partially exploded perspective view of FIG. 7 from another angle.
Figure 9:
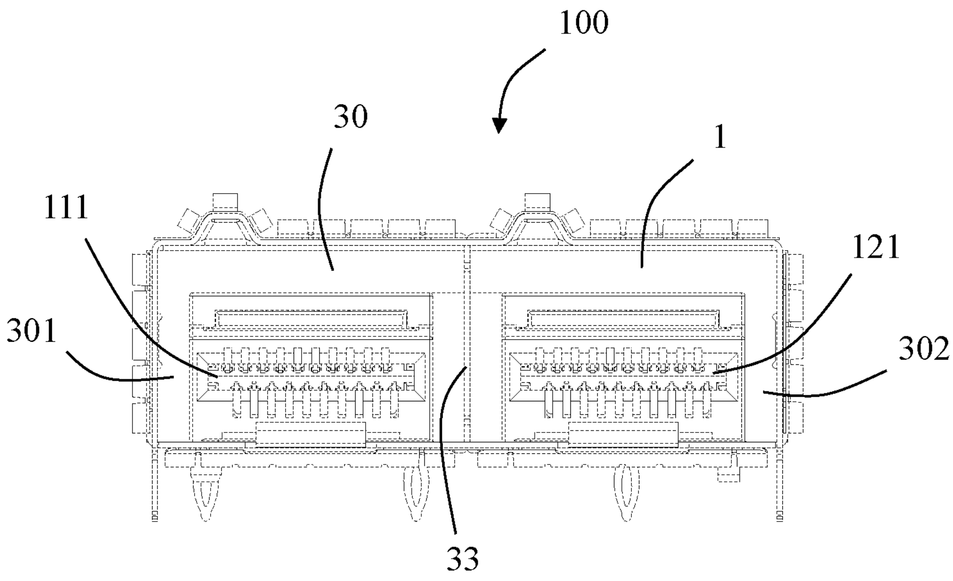
FIG. 9 is a front view of the receptacle connector in FIG. 5.
Figure 10:
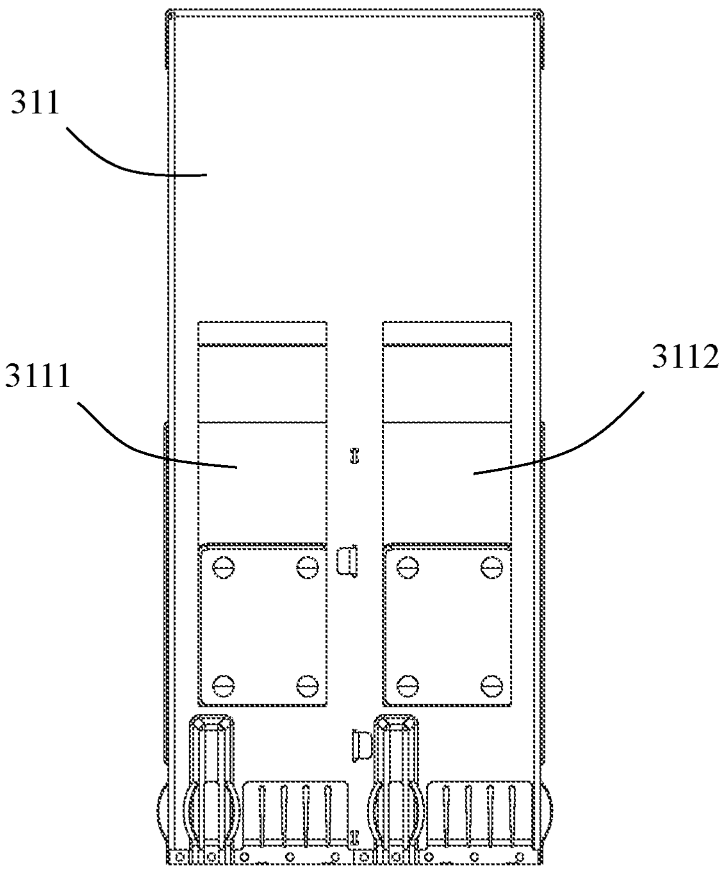
FIG. 10 is a top view of the receptacle connector in FIG. 5.
Figure 11:
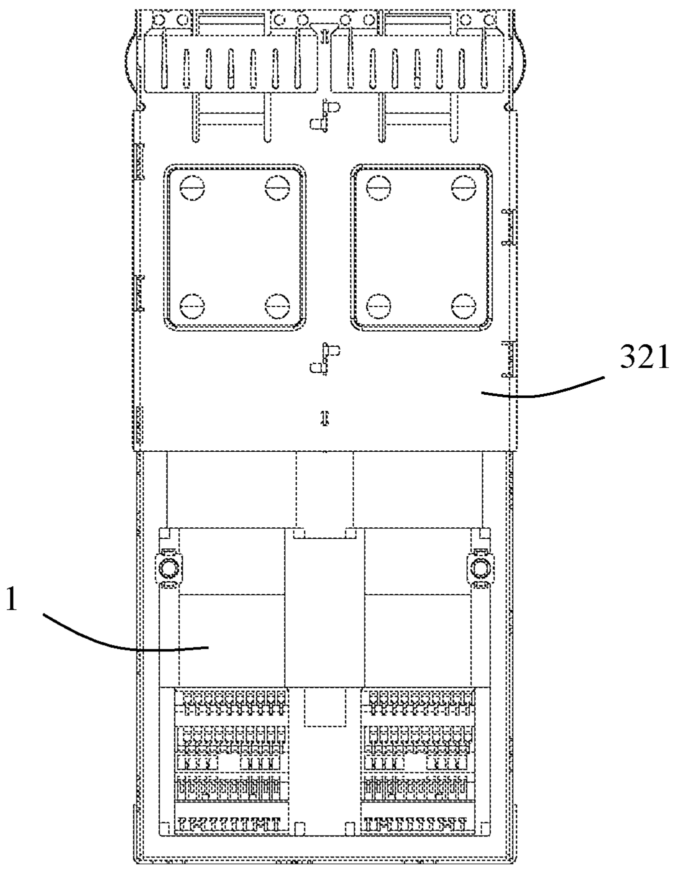
FIG. 11 is a bottom view of the receptacle connector in FIG. 5.

Referring to FIG. 5, the metal outer cage 3 includes a receiving space 30 located at a front end of the receptacle insulating body 1. The receiving space 30 is adapted for receiving the plug connector 200 along the first direction A1. In the embodiment shown in the present disclosure, the first insertion slot 111 and the second insertion slot 121 communicate with the receiving space 30.

Referring to FIG. 7, FIG. 8, FIG. 16 and FIG. 17, the metal outer cage 3 includes a first shell 31, a second shell 32 assembled with the first shell 31, and a separation piece 33 fixed to the first shell 31 and the second shell 32. The first shell 31 includes a top wall 311, a first side wall 312, a second side wall 313 and a rear wall 314. The first side wall 312 and the second side wall 313 are respectively formed by bending downwardly from opposite side edges of the top wall 311. The rear wall 314 is formed by bending downwardly from a rear edge of the top wall 311. The rear wall 314 is fixed to the first side wall 312 and the second side wall 313 by snapping. A plurality of first fixing grooves 3110 are provided at intervals along the first direction A1 in the middle of the top wall 311. The first side wall 312 is provided with a plurality of first mounting feet 3121 extending downwardly and a plurality of first locking feet 3122 extending downwardly. The first mounting feet 3121 are in the fish-eye shape to be press-fitted into the first mounting holes 403. The first locking feet 3122 are clamped and fixed in the first locking holes 404. The second side wall 313 is provided with a plurality of second mounting feet 3131 extending downwardly and a plurality of second locking feet 3132 extending downwardly. The second mounting feet 3131 are in the fish-eye shape to be press-fitted into the second mounting holes 405. The second locking feet 3132 are clamped and fixed in the second locking holes 406. The rear wall 314 is provided with a plurality of third mounting feet 3141 extending downwardly. The third mounting feet 3141 are in the fish-eye shape to be press-fitted into the third mounting holes 407.

The second shell 32 includes a bottom wall 321 mated with the first side wall 312 and the second side wall 313. The top wall 311, the first side wall 312, the second side wall 313 and the bottom wall 321 together define the receiving space 30. A plurality of second fixing grooves 3210 are provided at intervals along the first direction A1 in the middle of the bottom wall 321. The metal outer cage 3 further includes an opening 322 located at a rear end of the bottom wall 321 along the first direction A1. The receptacle insulating body 1 passes through the opening 322 along the third direction A3-A3 to be shielded in the metal outer cage 3. The bottom wall 321 is provided with a locking elastic piece 323 which protrudes upwardly into the receiving space 30 and is adapted for locking with the plug connector 200. In the embodiment shown in the present disclosure, the locking elastic piece 323 is provided with a locking hole 3230. The plug connector 200 is provided with a locking protrusion (not shown) which is lockable in the locking hole 3230.

In addition, the metal outer cage 3 further includes a plurality of grounding claws 315 fixed to outer sides of the top wall 311, the first side wall 312, the second side wall 313 and the bottom wall 321. The grounding claws 315 are adapted for abutting with a casing of an electronic device to realize grounding.

The separation piece 33 is located at the front end of the receptacle insulating body 1. The receiving space 30 includes a first receiving space 301 located between the first side wall 312 and the separation piece 33, and a second receiving space 302 located between the second side wall 313 and the separation piece 33. The first receiving space 301 communicates with the first insertion slot 111. The second receiving space 302 communicates with the second insertion slot 121. The top wall 311 is provided with a first hollow slot 3111 communicating with the first receiving space 301 and extending upwardly through the top wall 311, and a second hollow slot 3112 communicating with the second receiving space 302 and extending upwardly through the top wall 311.

In the embodiment shown in the present disclosure, the locking elastic piece 323 includes a first locking elastic piece 3231 protruding upwardly into the first receiving space 301, and a second locking elastic piece 3232 protruding upwardly into the second receiving space 302.

Figure 16:
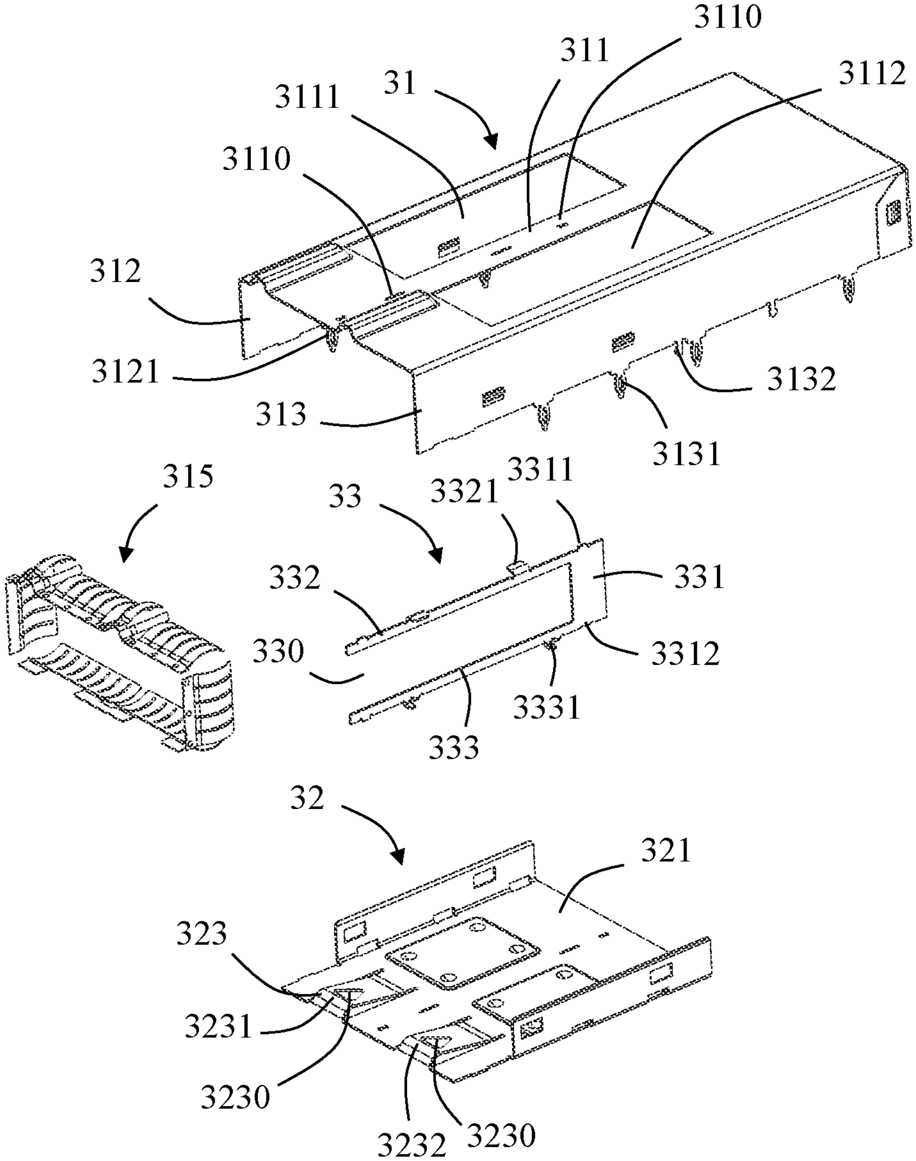
FIG. 16 is an exploded perspective view of the metal outer cage in FIG. 7.
Figure 17:
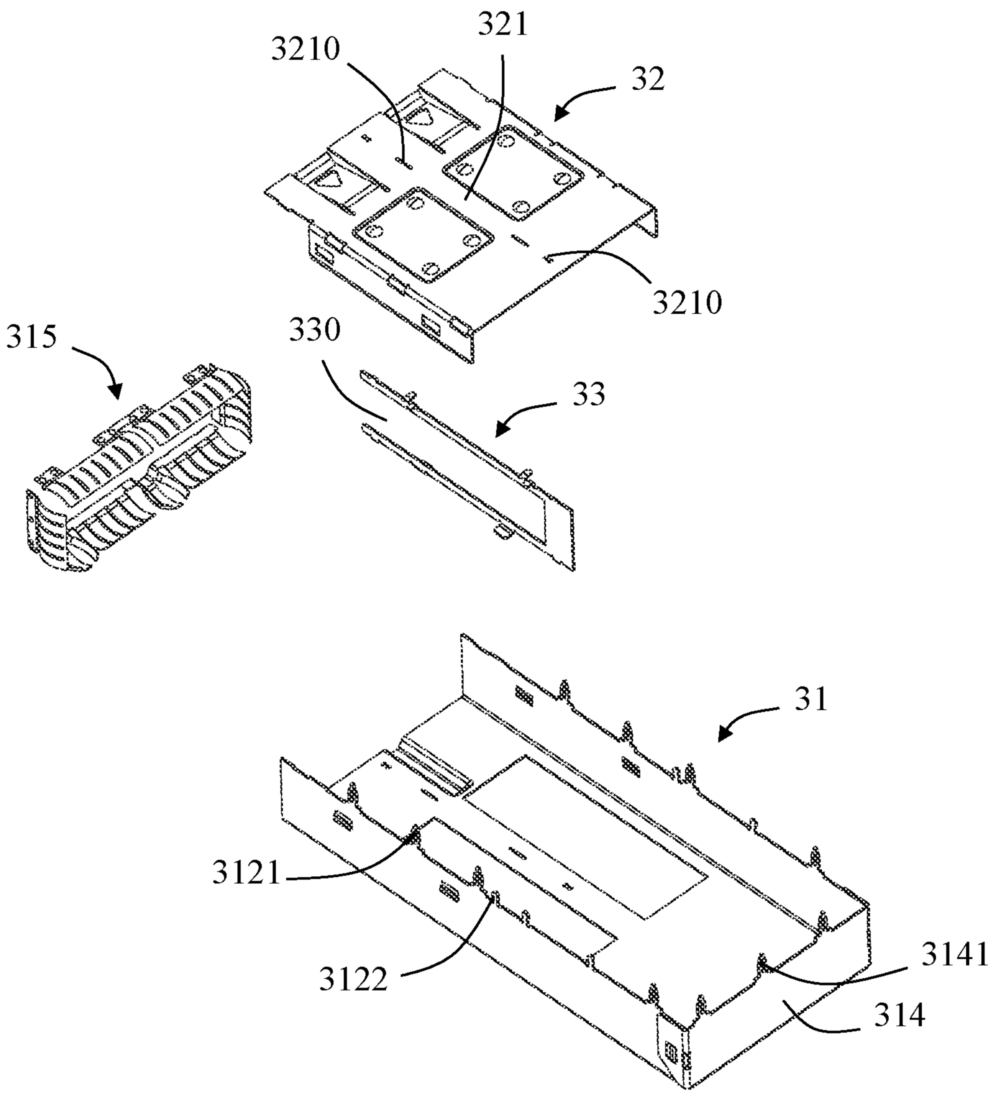
FIG. 17 is a perspective exploded view of FIG. 16 from another angle.
Figure 18:
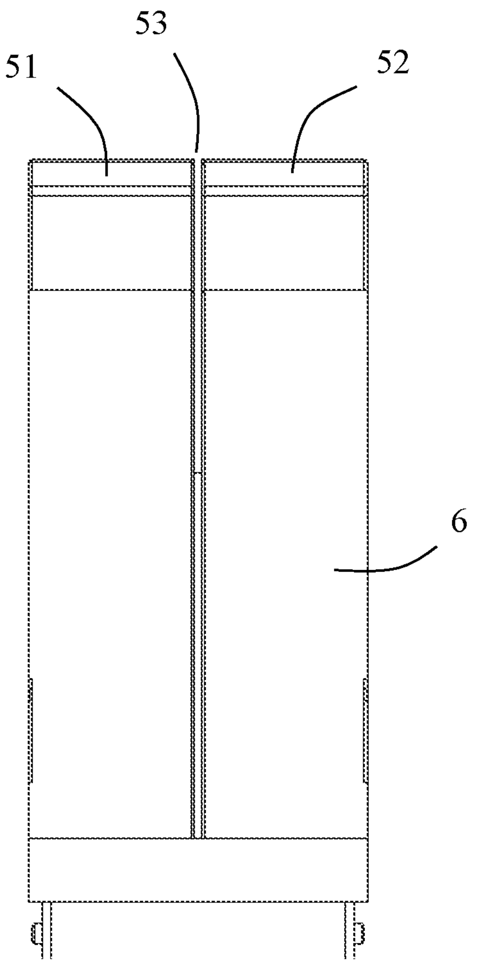
FIG. 18 is a top view of the plug connector in FIG. 5.
Figure 19:
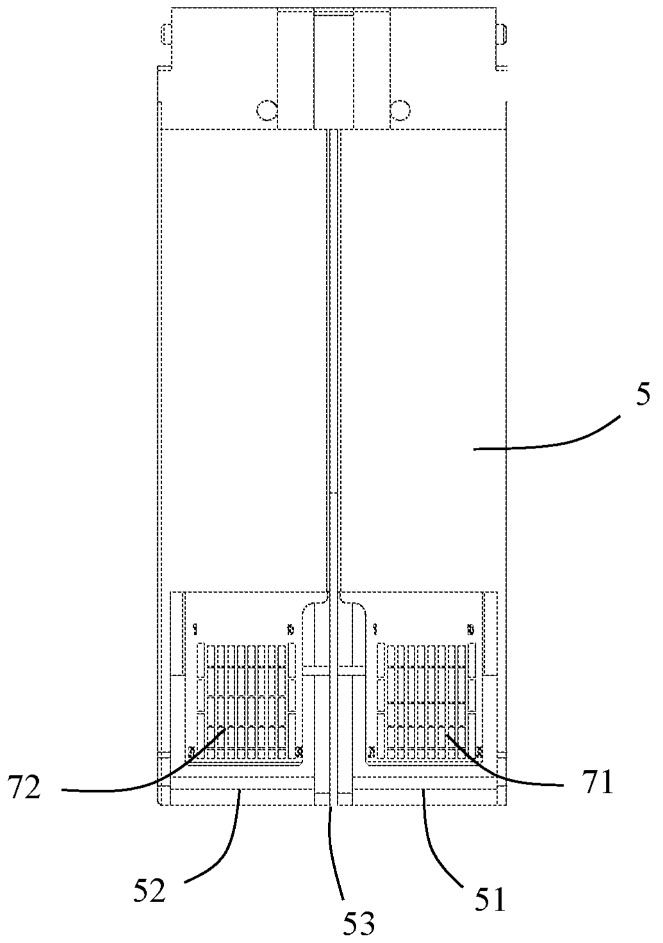
FIG. 19 is a bottom view of the plug connector in FIG. 5.
Figure 20:
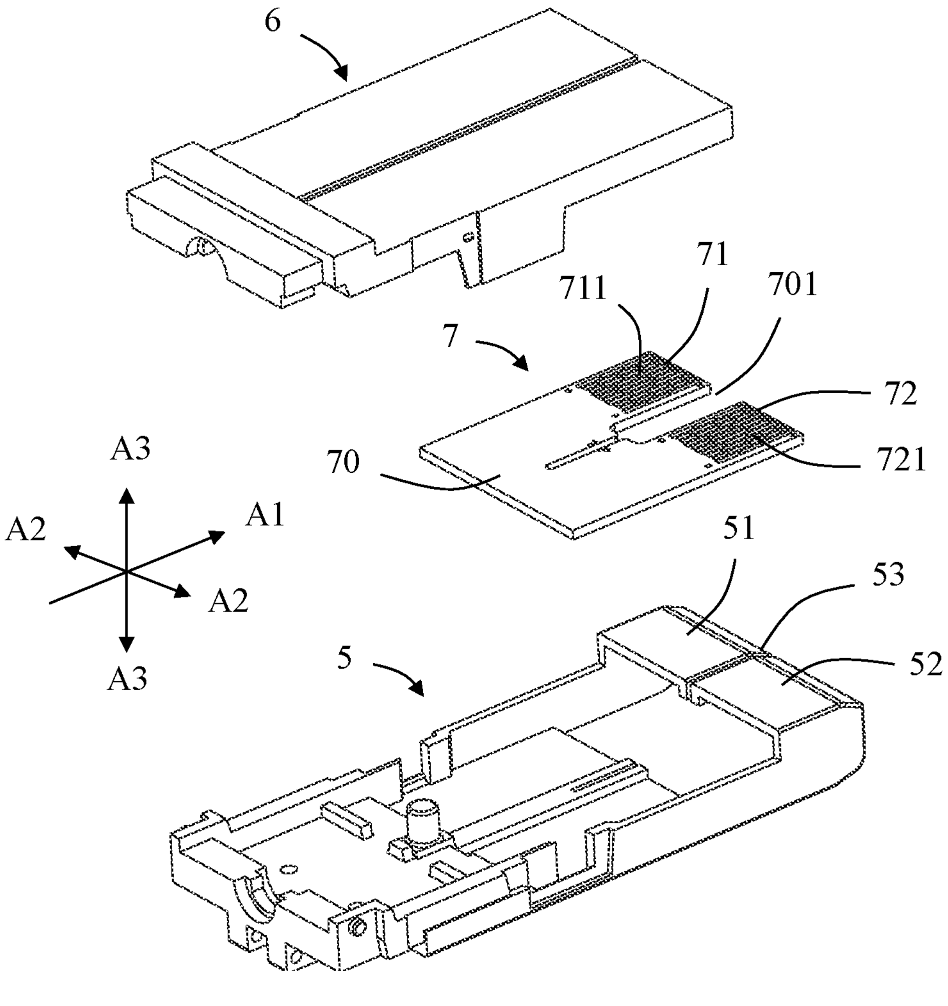
FIG. 20 is an exploded perspective view of the plug connector in FIG. 5.
Figure 21:
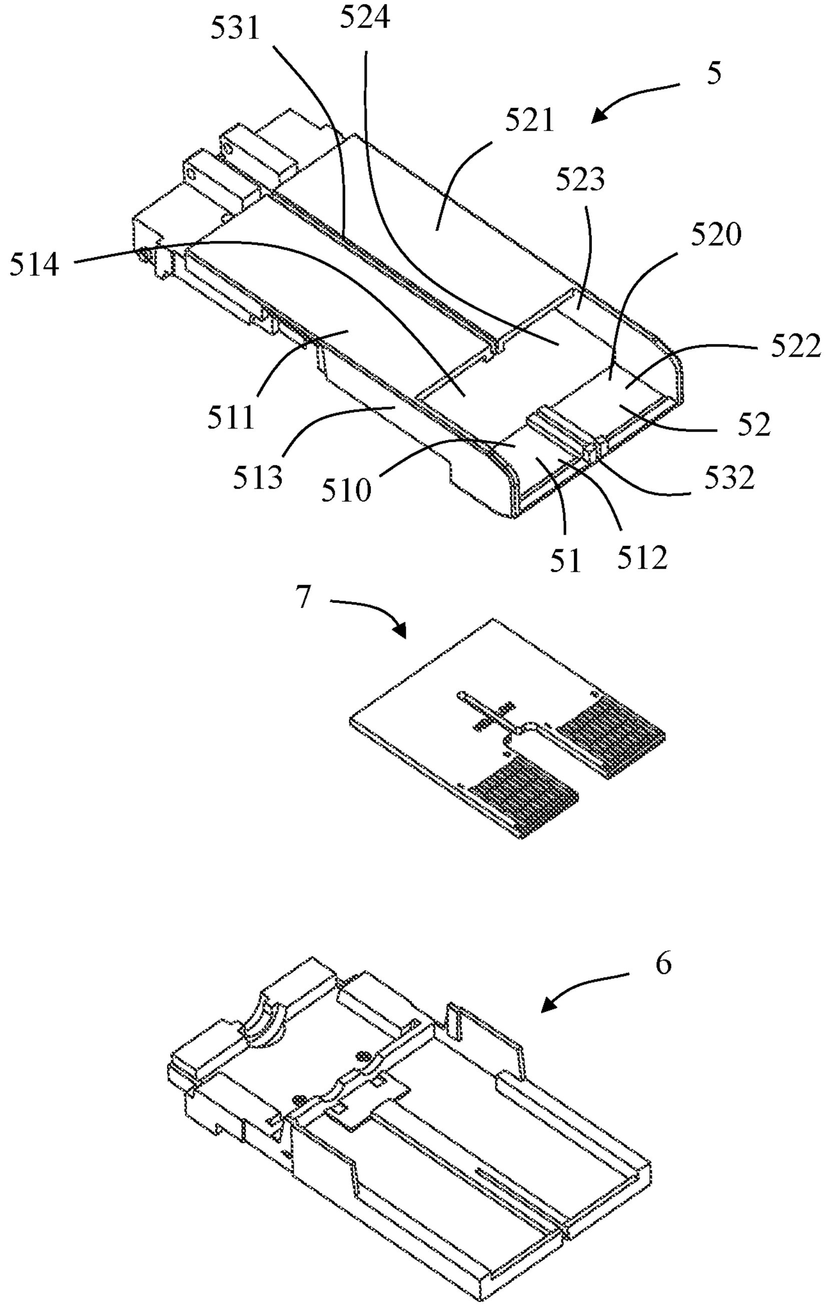
FIG. 21 is a perspective exploded view of FIG. 20 from another angle.
Figure 22:
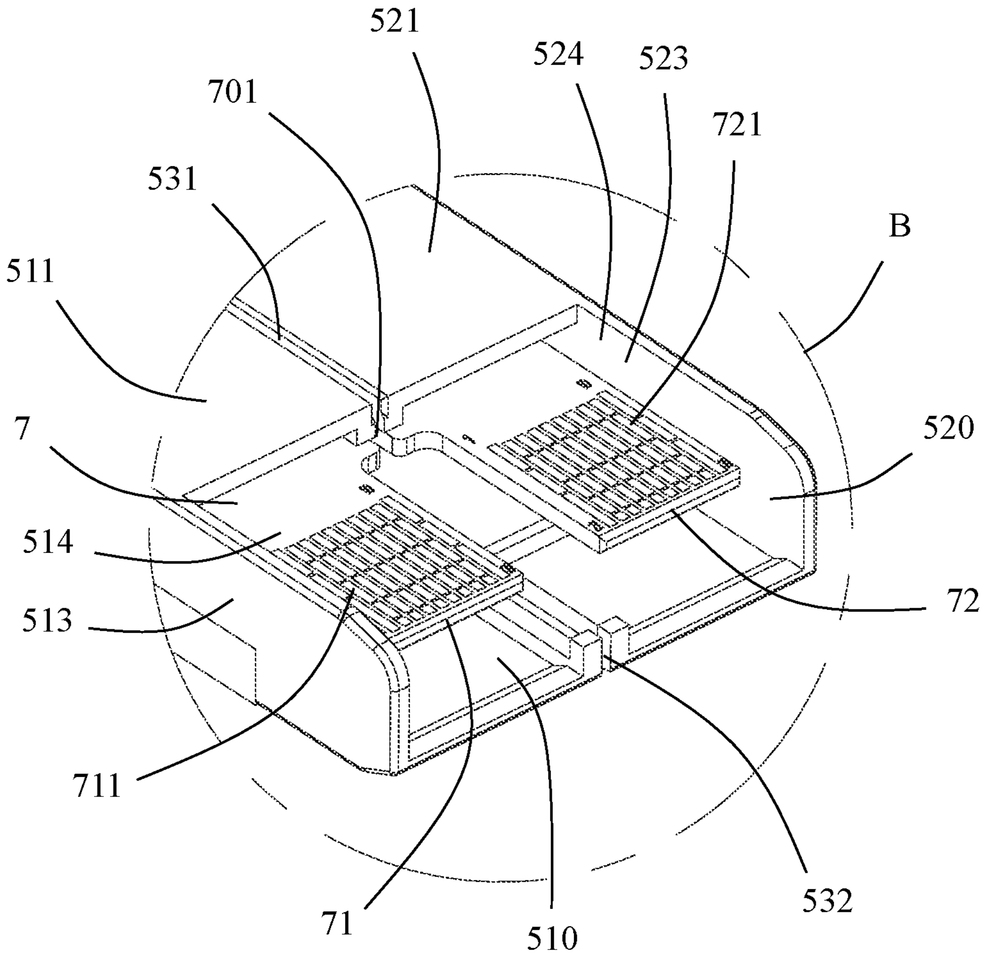
FIG. 22 is a partial enlarged view of a circled portion B in FIG. 6.
Figure 23:
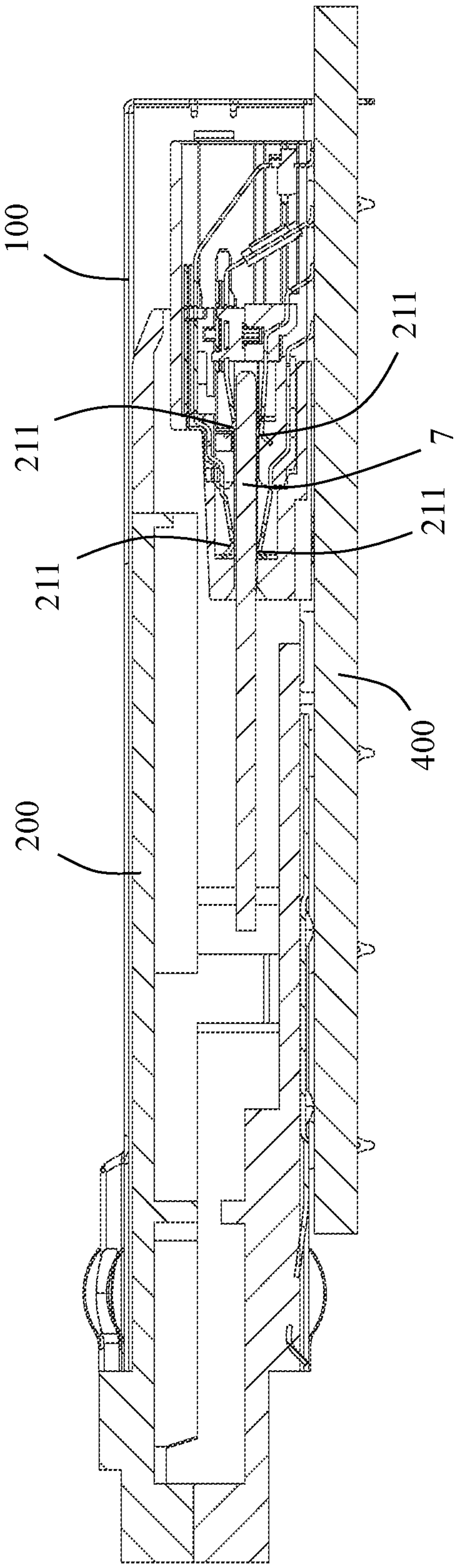
FIG. 23 is a schematic cross-sectional view taken along line C-C in FIG. 1.

In the illustrated embodiment of the present disclosure, the separation piece 33 is U-shaped. The separation piece 33 includes a vertical wall 331, a first extension wall 332 extending forwardly from a top of the vertical wall 331, and a second extension wall 333 extending forwardly from a bottom of the vertical wall 331. A top portion of the vertical wall 331 is fixed to the top wall 311 of the metal outer cage 3. A bottom portion of the vertical wall 331 is fixed to the bottom wall 321 of the metal outer cage 3. The first extension wall 332 is located below the top wall 311 and is perpendicular to the top wall 311. The second extension wall 333 is located above the bottom wall 321 and is perpendicular to the bottom wall 321. The first extension wall 332 and the second extension wall 333 both extend to a front end of the receiving space 30. In this way, the receiving space 30 is divided by the separation piece 33 into a first receiving space 301 and a second receiving space 302, which does not affect the insertion of the plug connector 200, nor does it affect the insertion of a standard SPF plug connector 200' into the first receiving space 301 or the second receiving space 302. At the same time, when other plug connectors are inserted into the receptacle connector 100 by mistake, the separation piece 33 extending to the front end can play the function of preventing wrong insertion at the first time. In other words, as shown in FIG. 16 and FIG. 17, the separation piece 33 includes a recess 330 opened forwardly. The recess 330 is configured to provide a place for the plug connector 200 to be inserted into the receiving space 30.

Specifically, in the embodiment shown in the present disclosure, the top portion of the vertical wall 331 is provided with a first protruding piece 3311 inserted into a corresponding first fixing groove 3110. The bottom portion of the vertical wall 331 is provided with a second protruding piece 3312 inserted into a corresponding second fixing groove 3210. In the embodiment shown in the present disclosure, the first protruding piece 3311 does not protrude upwardly beyond the top wall 311. The second protruding piece 3312 does not protrude downwardly beyond the bottom wall 321. In addition, a top portion of the first extension wall 332 is provided with a plurality of first fixing tabs 3321 which are inserted into corresponding first fixing grooves 3110. A bottom portion of the second extension wall 333 is provided with a plurality of second fixing tabs 3331 which are inserted into corresponding second fixing grooves 3210. In the illustrated embodiment of the present disclosure, at least one of the first fixing tabs 3321 protrudes beyond the top wall 311 and is bent to abut on the top wall 311. At least one of the second fixing tabs 3331 protrudes beyond the bottom wall 321 and is bent to abut on the bottom wall 321. By providing the first protruding piece 3311, the second protruding piece 3312, the first fixing tabs 3321 and the second fixing tabs 3331, the present disclosure can stably fix the separation piece 33 to the first shell 31 and the second shell 32.

The receptacle connector 100 is adapted for being mounted on the circuit board 400. The metal outer cage 3 is adapted for being mounted on the circuit board 400 along the third direction A3-A3 to shield the receptacle insulating body 1. It is understandable to those skilled in the art that the metal outer cage 3 of the receptacle connector 100 is equivalent to an outer shielding cage, so as to provide the receiving space 30 for receiving the mating connector 200 and locking with the mating connector 200. The receptacle insulating body 1 is located inside the metal outer cage 3 in order to achieve a better shielding effect on the conductive terminals 2. In the illustrated embodiment of the present disclosure, the receptacle insulating body 1 and the metal outer cage 3 do not have a mutual fixing effect, which is different from an outer shell of some electrical connectors in the prior art.

Referring to FIG. 5, FIG. 6, and FIGS. 18 to 22, in the embodiment shown in the present disclosure, the plug connector 200 includes a metal plug housing 5, a mating housing 6 assembled with the metal plug housing 5, and a built-in circuit board 7.

The metal plug housing 5 includes a first plug portion 51 and a second plug portion 52. The first plug portion 51 and the second plug portion 52 are arranged side by side along the second direction A2-A2. The first plug portion 51 and the second plug portion 52 are integrally formed. The first plug portion 51 includes a first accommodating space 510. The second plug portion 52 includes a second accommodating space 520.

The metal plug housing 5 further includes a spacing groove 53 which separates the first plug portion 51 and the second plug portion 52 along the second direction A2-A2. The spacing groove 53 extend through an end of the metal plug housing 5 along the first direction A1.

The first plug portion 51 includes a first wall portion 511, a second wall portion 512 disposed opposite to the first wall portion 511, and a first side wall portion 513 connecting the first wall portion 511 and the second wall portion 512. The second plug portion 52 includes a third wall portion 521, a fourth wall portion 522 disposed opposite to the third wall portion 521, and a second side wall portion 523 connecting the third wall portion 521 and the fourth wall portion 522. The first wall portion 511 and the third wall portion 521 are located on a first side (e.g., a lower side) of the plug connector 200. The second wall portion 512 and the fourth wall portion 522 are located on a second side (e.g., an upper side) of the plug connector 200. The first side wall portion 513 and the second side wall portion 523 are respectively located on two sides (e.g., left and right sides) of the plug connector 200. The first plug portion 51 further includes a first opening 514 located at an end of the first wall portion 511 along the first direction A1. The second plug portion 52 further includes a second opening 524 located at an end of the third wall portion 521 along the first direction A1. The first opening 514 communicates with the second opening 524.

The spacing groove 53 includes a first spacing groove 531 located between the first wall portion 511 and the third wall portion 521 along the second direction A2-A2, and a second spacing groove 532 located between the second wall portion 512 and the fourth wall portion 522 along the second direction A2-A2. The second spacing groove 532 extends at least partially into the mating housing 6 in a direction opposite to the first direction A1.

The built-in circuit board 7 includes a base portion 70, a first tongue plate 71 integrally extending from one side of the base portion 70, and a second tongue plate 72 integrally extending from the other side of the base portion 70. The first tongue plate 71 and the second tongue plate 72 are arranged side by side along the second direction A2-A2. The first tongue plate 71 is suspended in the first accommodating space 510. That is, a periphery of the first tongue plate 71 is not in contact with the metal plug housing 5 and the mating housing 6. The second tongue plate 72 is suspended in the second accommodating space 520. That is, a periphery of the second tongue plate 72 is not in contact with the metal plug housing 5 and the mating housing 6. In the embodiment shown in the present disclosure, the built-in circuit board 7 is a whole. That is, the first tongue plate 71 and the second tongue plate 72 are integrated so as to improve the structural strength of the built-in circuit board 7. The built-in circuit board 7 is provided with an escape groove 701 located in front of the first tongue plate 71 and the second tongue plate 72 and extending along the first direction A1. The escape groove 701 extends into the base portion 70. The escape groove 701 is aligned with the spacing groove 53 in the third direction A3-A3 so as to cooperate with the separation piece 33.

At least one surface of the first tongue plate 71 is provided with a plurality of first conductive pads 711. At least one surface of the second tongue plate 72 is provided with a plurality of second conductive pads 721. The first tongue plate 71 is exposed to the first opening 514 along the third direction A3-A3. The second tongue plate 72 is exposed to the second opening 524 along the third direction A3-A3.

Referring to FIGS. 1 to 23, when the plug connector 200 is mated with the receptacle connector 100, the first plug portion 51 and the second plug portion 52 of the plug connector 200 are inserted into the receiving space 30 of the receptacle connector 100; the first tongue plate 71 is inserted into the first insertion slot 111, so that the first elastic mating portions 211 of the first conductive terminals 21 are in contact with the first conductive pads 711 of the first tongue plate 71; the second tongue plate 72 is inserted into the second insertion slot 121, so that the second elastic mating portions 221 of the second conductive terminals 22 are in contact with the second conductive pads 721 of the second tongue plate 72.

Figure 24:
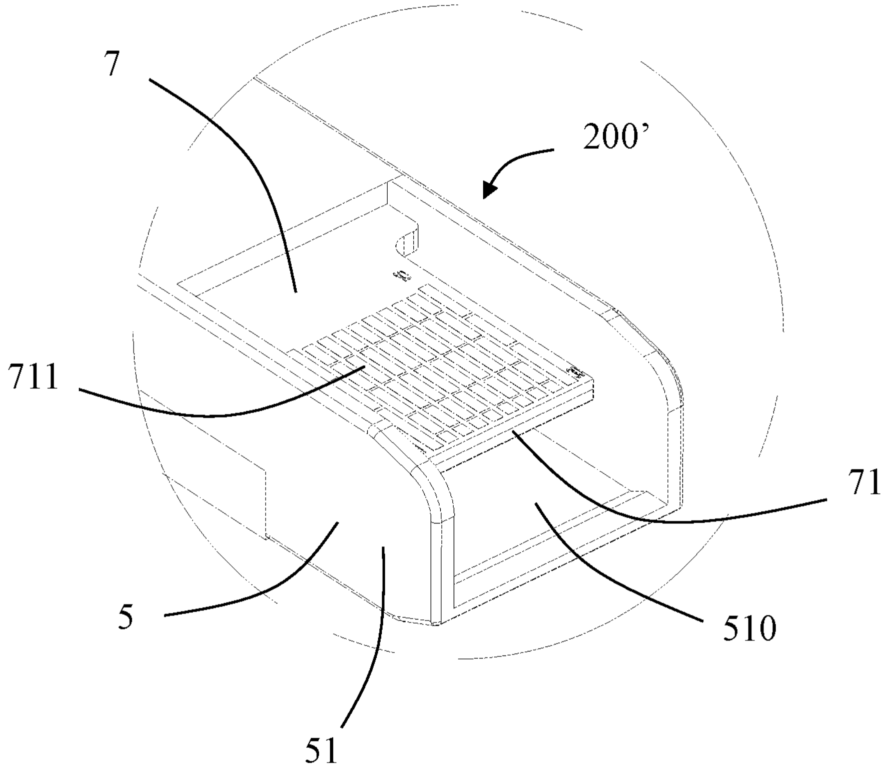
FIG. 24 is a partial enlarged view of a plug connector in another embodiment.

It is understandable to those skilled in the art that the receptacle connector 100 of the present disclosure can also receive a plug connector 200' (e.g., an SFP plug connector, as shown in FIG. 24) having one plug port. At this time, the plug connector 200' may only be inserted into the first receiving space 301. Alternatively, the plug connector 200' may only be inserted into the second receiving space 302. Alternatively, if two plug connectors 200' are provided, one of the two plug connectors 200' can be inserted into the first receiving space 301, and the other can be inserted into the second receiving space 302.

Referring to FIG. 24, the plug connector 200' includes a metal plug housing 5 and a built-in circuit board 7. The metal plug housing 5 includes a first plug portion 51. The first plug portion 51 includes a first accommodating space 510. The built-in circuit board 7 includes a first tongue plate 71 suspended in the first accommodating space 510. At least one surface of the first tongue plate 71 is provided with a plurality of first conductive pads 711. The plug connector 200' is configured to be inserted into the first receiving space 301 or the second receiving space 302 of the receptacle connector 100 along the first direction A1, wherein the first tongue plate 71 is inserted into the first insertion slot 111 or the second insertion slot 121, so that the first conductive pads 711 of the first tongue plate 71 are brought into contact with the first elastic mating portions 211 of the first conductive terminals 21 or the second elastic mating portions 221 of the second conductive terminals 22.

Compared with the prior art, in an embodiment of the present disclosure, the first receptacle portion 11 and the second receptacle portion 12 are integrally formed, so that a single receptacle connector 100 has at least two ports. When the receptacle connector 100 is installed on the circuit board 400, it is equivalent to install at least two ports to the circuit board 400 at the same time.

In addition, a single plug connector 200 is provided with at least two plug ports by integrally molding the first plug portion 51 and the second plug portion 52. When the plug connector 200 is inserted into the receptacle connector 100, at least two plug connectors are connected to the receptacle connector 100 at the same time.

The connector assembly 300 of the present disclosure includes the receptacle connector 100 and the plug connector 200, 200', which has the beneficial effects of the receptacle connector 100 and the plug connector 200, 200'. In addition, the receptacle connector 100 can also be mated with a standard single plug connector 200' to provide a variety of mating scenarios. For example, at this time, the plug connector 200' may only be inserted into the first receiving space 301. Alternatively, the plug connector 200' may only be inserted into the second receiving space 302. Alternatively, if two plug connectors 200' are provided, one of the two plug connectors 200' is inserted into the first receiving space 301, and the other is inserted into the second receiving space 302.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A receptacle connector, comprising:

a receptacle insulating body;

a plurality of conductive terminals disposed on the receptacle insulating body; and a metal outer cage, the metal outer cage shielding the receptacle insulating body, the metal outer cage comprising a receiving space located at a front end of the receptacle insulating body, the receiving space is configured to receive a plug connector along a first direction;

wherein the receptacle insulating body comprises a first receptacle portion and a second receptacle portion; the first receptacle portion and the second receptacle portion are arranged side by side along a second direction perpendicular to the first direction; the first receptacle portion and the second receptacle portion are integrally formed; the first receptacle portion comprises a first insertion slot; the second receptacle portion comprises a second insertion slot; the first insertion slot and the second insertion slot communicate with the receiving space;

wherein the plurality of conductive terminals comprise a plurality of first conductive terminals and a plurality of second conductive terminals, each first conductive terminal comprises a first elastic mating portion protruding into the first insertion slot, and each second conductive terminal comprises a second elastic mating portion protruding into the second insertion slot; and wherein the metal outer cage comprises a separation piece which is located at the front end of the receptacle insulating body, the separation piece comprises a recess opened forwardly, and the recess is configured to provide a place for the plug connector to be inserted into the receiving space.

2. The receptacle connector according to claim 1, wherein the first elastic mating portions of the first conductive terminals are provided in at least two rows, and the first elastic mating portions are respectively located on opposite sides of the first insertion slot along a third direction; the second elastic mating portions of the second conductive terminals are provided in at least two rows, and the second elastic mating portions are respectively located on opposite sides of the second insertion slot along the third direction; and the third direction is perpendicular to the first direction and the second direction.

3. The receptacle connector according to claim 1, wherein the receptacle insulating body comprises a base, the first receptacle portion and the second receptacle portion are integrally extended from the base, the receptacle insulating body further comprises a spacing slot located between the first receptacle portion and the second receptacle portion along the second direction, and the spacing slot is configured to partially receive the plug connector.

4. The receptacle connector according to claim 3, wherein the first receptacle portion and the second receptacle portion are symmetrically arranged along the spacing slot.

5. The receptacle connector according to claim 3, wherein the receptacle insulating body comprises a connection wall connecting the first receptacle portion and the second receptacle portion, and the connection wall is located at a bottom of the spacing slot.

6. The receptacle connector according to claim 1, wherein the receptacle connector is mounted to a circuit board, the metal outer cage is configured to be mounted to the circuit board along a third direction to shield the receptacle insulating body, and the third direction is perpendicular to the first direction and the second direction.

7. The receptacle connector according to claim 6, wherein the metal outer cage comprises a first shell and a second shell assembled with the first shell; the first shell comprises a top wall, a first side wall and a second side wall; the second shell comprises a bottom wall matched with the first side wall and the second side wall; the top wall, the first side wall, the second side wall and the bottom wall are enclosed to form the receiving space; and wherein the metal outer cage further comprises an opening located at a rear end of the bottom wall along the first direction, and the receptacle insulating body passes through the opening along the third direction to be shielded in the metal outer cage.

8. The receptacle connector according to claim 7, wherein the bottom wall is provided with a locking elastic piece which protrudes upwardly into the receiving space and is configured to be locked with the plug connector.

9. The receptacle connector according to claim 7, wherein the metal outer cage comprises a separation piece, the separation piece is located at the front end of the receptacle insulating body, the receiving space comprises a first receiving space located between the first side wall and the separation piece, and a second receiving space located between the second side wall and the separation piece, the first receiving space communicates with the first insertion slot, and the second receiving space communicates with the second insertion slot.

10. The receptacle connector according to claim 9, wherein the separation piece is U-shaped and comprises a vertical wall, a first extension wall extending forwardly from a top of the vertical wall, and a second extension wall extending forwardly from a bottom of the vertical wall; a top portion of the vertical wall is fixed to the top wall of the metal outer cage; a bottom portion of the vertical wall is fixed to the bottom wall of the metal outer cage; the first extension wall is located below the top wall and is perpendicular to the top wall; the second extension wall is located above the bottom wall and is perpendicular to the bottom wall; and the first extension wall and the second extension wall both extend to a front end surface of the receiving space.

11. A plug connector configured to be inserted into a receptacle connector along a first direction, the plug connector comprising:

a metal plug housing; and a built-in circuit board;

wherein the metal plug housing comprises a first plug portion and a second plug portion; the first plug portion and the second plug portion are arranged side by side along a second direction perpendicular to the first direction; the first plug portion and the second plug portion are integrally formed; the first plug portion comprises a first accommodating space, the second plug portion comprises a second accommodating space; and wherein the built-in circuit board comprises a first tongue plate suspended in the first accommodating space and a second tongue plate suspended in the second accommodating space, at least one surface of the first tongue plate is provided with a plurality of first conductive pads, and at least one surface of the second tongue plate is provided with a plurality of second conductive pads.

12. The plug connector according to claim 11, wherein the metal plug housing comprises a spacing groove separating the first plug portion and the second plug portion along the second direction, and the spacing groove extends through an end of the metal plug housing along the first direction.

13. The plug connector according to claim 12, wherein the first plug portion comprises a first wall portion and a second wall portion disposed opposite to the first wall portion; the second plug portion comprises a third wall portion and a fourth wall portion disposed opposite to the third wall portion; the first wall portion and the third wall portion are located on a first side of the plug connector; the second wall portion and the fourth wall portion are located on a second side of the plug connector;

wherein the first plug portion further comprises a first opening located at an end of the first wall portion along the first direction, the first tongue plate is exposed to the first opening along a third direction perpendicular to the first direction and the second direction; and wherein the second plug portion further comprises a second opening located at an end of the third wall portion along the first direction, the second tongue plate is exposed to the second opening along the third direction, and the first opening communicates with the second opening.

14. The plug connector according to claim 13, wherein the spacing groove comprises a first spacing groove located between the first wall portion and the third wall portion along the second direction, and a second spacing groove located between the second wall portion and the fourth wall portion along the second direction.

15. The plug connector according to claim 11, further comprising a mating housing assembled with the metal plug housing, the second spacing groove extending at least partially into the mating housing in a direction opposite to the first direction.

16. A connector assembly, comprising:

a receptacle connector comprising:

a receptacle insulating body;

a plurality of conductive terminals disposed on the receptacle insulating body; and a metal outer cage, the metal outer cage shielding the receptacle insulating body, the metal outer cage comprising a receiving space located at a front end of the receptacle insulating body, the receiving space is configured to receive a plug connector along a first direction;

wherein the receptacle insulating body comprises a first receptacle portion and a second receptacle portion; the first receptacle portion and the second receptacle portion are arranged side by side along a second direction perpendicular to the first direction; the first receptacle portion and the second receptacle portion are integrally formed; the first receptacle portion comprises a first insertion slot; the second receptacle portion comprises a second insertion slot; the first insertion slot and the second insertion slot communicate with the receiving space; and wherein the plurality of conductive terminals comprise a plurality of first conductive terminals and a plurality of second conductive terminals, each first conductive terminal comprises a first elastic mating portion protruding into the first insertion slot, and each second conductive terminal comprises a second elastic mating portion protruding into the second insertion slot; and a plug connector according to claim 11;

wherein the first plug portion and the second plug portion of the plug connector are inserted into the receiving space of the receptacle connector; the first tongue plate is inserted into the first insertion slot, so that the first elastic mating portions of the first conductive terminals contact the first conductive pads of the first tongue plate; and the second tongue plate is inserted into the second insertion slot, so that the second elastic mating portions of the second conductive terminals contact the second conductive pads of the second tongue plate.

17. The connector assembly according to claim 16, wherein the receptacle insulating body comprises a base, the first receptacle portion and the second receptacle portion are integrally extended from the base, the receptacle insulating body further comprises a spacing slot located between the first receptacle portion and the second receptacle portion along the second direction, and the spacing slot is configured to partially receive the plug connector.

18. A connector assembly, comprising:

a receptacle connector, comprising:

a receptacle insulating body;

a plurality of conductive terminals arranged on the receptacle insulating body; and a metal outer cage shielding the receptacle insulating body, the metal outer cage comprising a receiving space located at a front end of the receptacle insulating body, the receiving space being configured to receive a plug connector along a first direction;

wherein the receptacle insulating body comprises a first receptacle portion and a second receptacle portion;

the first receptacle portion and the second receptacle portion are arranged side by side along a second direction perpendicular to the first direction; the first receptacle portion and the second receptacle portion are integrally formed; the first receptacle portion comprises a first insertion slot; the second receptacle portion comprises a second insertion slot; the receiving space comprises a first receiving space and a second receiving space; the first receiving space communicates with the first insertion slot; and the second receiving space communicates with the second insertion slot;

wherein the plurality of conductive terminals comprise a plurality of first conductive terminals and a plurality of second conductive terminals; each first conductive terminal comprises a first elastic mating portion protruding into the first insertion slot; each second conductive terminal comprises a second elastic mating portion protruding into the second insertion slot; and a plug connector, comprising:

a metal plug housing; and a built-in circuit board;

wherein the metal plug housing comprises a first plug portion, and the first plug portion comprises a first accommodating space; and wherein the built-in circuit board comprises a first tongue plate suspended in the first accommodating space, and at least one surface of the first tongue plate is provided with a plurality of first conductive pads;

wherein the plug connector is configured to be inserted into the first receiving space or the second receiving space of the receptacle connector along the first direction; the first tongue plate is inserted into the first insertion slot or the second insertion slot, so that the first conductive pads of the first tongue plate contact the first elastic mating portions of the first conductive terminals or the second elastic mating portions of the second conductive terminals;

wherein the metal plug housing comprises a second plug portion; the first plug portion and the second plug portion are arranged side by side; the first plug portion and the second plug portion are integrally formed; the second plug portion comprises a second accommodating space; and wherein the built-in circuit board comprises a second tongue plate suspended in the second accommodating space, and at least one surface of the second tongue plate is provided with a plurality of second conductive pads.

19. The connector assembly according to claim 18, wherein the receptacle insulating body comprises a base, the first receptacle portion and the second receptacle portion are integrally extended from the base, the receptacle insulating body further comprises a spacing slot located between the first receptacle portion and the second receptacle portion along the second direction, and the spacing slot is configured to partially receive the plug connector.

20. The connector assembly according to claim 18, wherein the metal outer cage comprises a separation piece which is located at the front end of the receptacle insulating body, the separation piece comprises a recess opened forwardly, and the recess is configured to provide a place for the plug connector to be inserted into the receiving space.

* * * * *